UNITED STATES PATENT OFFICE.

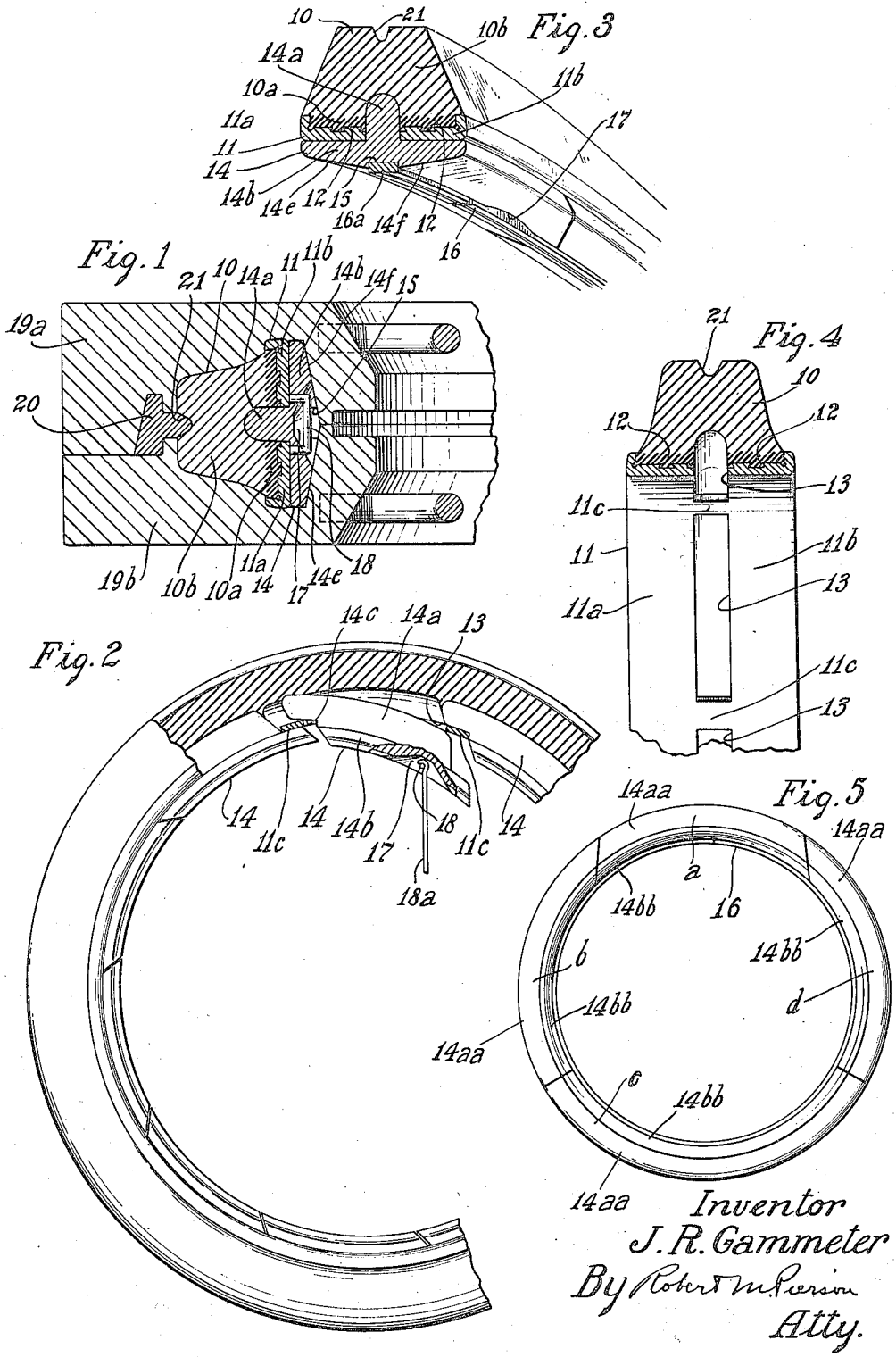

JOHN R. GAMMETER, OF AKRON, OHIO, ASSIGNOR TO THE B. F. GOODRICH COMPANY, OF NEW YORK, N. Y., A CORPORATION OF NEW YORK.

APPARATUS FOR MAKING CUSHION TIRES.

1,418,639.              Specification of Letters Patent.        Patented June 6, 1922.

Application filed October 6, 1921. Serial No. 505,884.

*To all whom it may concern:*

Be it known that I, JOHN R. GAMMETER, a citizen of the United States, residing at Akron, in the county of Summit and State of Ohio, have invented a certain new and useful Apparatus for Making Cushion Tires, of which the following is a specification.

This invention relates to apparatus for making rubber cushion tires and more particularly tires comprising a tire-body hollowed or recessed from its inner periphery and vulcanized onto a metal base.

My objects are to provide improved apparatus of simple construction adapted for rapid, accurate and easy operation, and to obtain an improved product.

This application covers an improvement on the tire-making apparatus described in my prior application, Serial No. 388,090, filed June 11, 1920.

Of the accompanying drawings:

Fig. 1 is a sectional view showing, in a preferred form, certain features of my improved molding apparatus.

Fig. 2 is a side elevation, with parts broken away and in section, of a completed tire, showing the arrangement and manner of removing the core members.

Fig. 3 is a perspective view of a part of a built up tire as it appears before vulcanization, and a part of my apparatus associated therewith.

Fig. 4 is a sectional view of a finished tire as produced by the apparatus shown in Figs. 1, 2 and 3.

Fig. 5 is a side elevation of a modified form of core.

Referring to the drawings, 10 is a tire-body upon an annular tire base 11, the latter being formed with the usual grooves 12, 12 on its outer periphery for anchoring the tire-body, and with openings or slots 13, 13 therethrough, from its inner to its outer periphery, dividing said base into side portions 11$^a$, 11$^b$. Said openings are separated by bridges 11$^c$, 11$^c$ and are adapted each to receive from the inner side of the base one of a set of core members or sections 14, 14. Each of said core members is of a general arcuate form and comprises an outer molding portion 14$^a$ adapted to extend through the slot 13 to form a cavity in the tire-body, and a relatively wide base portion 14$^b$ adapted to abut the inner faces of the side portions 11$^a$, 11$^b$ of the base 11 and the bridges 11$^c$, to limit the outward movement of the core member. The inner periphery of the base portion 14$^b$ presents two conical or beveled surfaces 14$^e$, 14$^f$ (Figs. 1 and 3.) One end of each molding portion 14$^a$ extends beyond the base portion 14$^b$ and is cut away, as indicated at 14$^c$, to permit it to accommodate or overlap one of the bridges 11$^c$ when the core member is seated. At the other end of the core member the base portion 14$^b$ extends beyond the molding portion 14$^a$ and is adapted to abut the inner face of the bridge 11$^c$.

The end faces of both the molding portions 14$^a$ and the base portions 14$^b$ are preferably non-radial with respect to the curved general form of the core members, which latter, by reason of the oblique character of said end faces, as shown in Fig. 2, are adapted to be mounted and withdrawn from the inner side of the tire base 11 and in effect to constitute, when assembled in the latter, a continuous annular core upon the outer side thereof, while the base portions 14$^b$ on the inner side of the base 11 constitute a substantially complete annular structure.

The core members 14 are formed on their inner sides with longitudinal, medially positioned grooves 15 adapted, when the core members 14 are assembled, to receive a transversely split locking or spreading ring 16, adapted to urge the core members outward against the side portions 11$^a$, 11$^b$ and the bridges 11$^c$ of the base 11, and thus maintain them in their assembled relation. The ring 16 is formed with a groove 16$^a$ (Fig. 2) on its inner side to receive the arms of a spider such as is commonly used for supporting and rotating the base in building solid tires.

Each core member 14 is also formed with a recess 17 in enlargement of the groove 15 at a point relatively near the extended end of the base portion 14$^b$, and 18 is an anchor loop, spanning this recess and secured in the core member, to be engaged by a hook 18$^a$ (Fig. 2) for pulling the core member out of the finished tire.

In Fig. 1, 19$^a$, 19$^b$ are the respective sections of a two-part tire mold formed with molding cavities adapted to receive the tire base 11 and the core members 14 as well as the tire-body 10, their radially inner cavity walls being conical or beveled to coact with the beveled faces of the base portions 14$^b$ of the core members 14.

The upper mold section is also formed with an annular recess, at the outer periphery of its molding cavity and in communication therewith, adapted to accommodate a series of arcuate molding members, one of which is shown at 20 in Fig. 1, and by a wedging action to force said members radially inward when the mold sections are forced together, to mold a circumferential groove 21 in the tread of the tire.

In the operation of the apparatus as illustrated in Figs. 1, 2, 3 and 4, the core members 14 are assembled in the base 11 as hereinbefore indicated and are secured in place by springing the split ring 16 into the aligned grooves 15 formed in their inner peripheries. The tire-body 10, preferably comprising a layer of hard rubber compound 10$^a$ next to the metal base and a body of cushion rubber 10$^b$ thereon, as shown in Figs. 1 and 3, is then built upon the base and core, in which operation the base may be rotated by the usual spider, the arms of the latter engaging the groove 16$^a$ of the ring 16. The resulting structure, including the tire-body 10, the base 11 and the core members 14, is laid in the lower mold section 19$^b$ and the arcuate tread-molding members 20 are assembled upon the lower mold section 19$^b$ around the tire body 10. The upper mold section 19$^a$ is then lowered into position and the complete mold with the assembled parts therein is placed in a vulcanizing press and subjected to pressure and heat as in the usual practice. As the mold sections are forced together, the tread-molding members, 20, are wedged radially inward by the upper mold section bearing upon their sloping outer surfaces, to form the groove 21 in the tire tread, while the radially inner walls of the molding cavities, coacting with the conical walls 14$^e$, 14$^f$ (Fig. 1) of the core members 14, wedge the latter outward into firm contact with the base 11, thus securing the latter accurately in position and preventing distortion thereof by the molding pressure. I prefer to remove the ring 16 before placing the tire in the mold, the compacted rubber of the tire-body serving to hold the core members in position after the tire is built up, but the depth of the grooves 15 may be such that the ring may be allowed to remain in place when the tire is placed in the mold.

When the vulcanization is complete, the mold sections 19$^a$, 19$^b$ are separated, and the tire lifted from the lower mold section. The tread-molding members 20 are removed from the tire, which obviously is a matter of no difficulty, and the core members 14 are each removed from the tire-body by means of the pulling hook 18$^a$ engaging the anchor loop 18.

The apparatus heretofore described is thus well adapted for making, with great facility, an arched cushion tire-body having its legs vulcanized to an integral metal tire base, and the tire-body may be formed with a continuous annular cavity or with a series of cavities divided by webs, according to the length, number and form of the molding portions 14$^a$ of the core members. The molding portions 14$^a$ of the core members 14 being integral with their base portions 14$^b$, and the latter being in contact throughout a large area with the mold members 19$^a$, 19$^b$, during vulcanization, an improved conduction of heat to the inner regions of the tire-body is effected and an improved product thereby obtained.

Fig. 5 shows a modified form of core members or sections adapted for forming a cushion tire with a continuous annular cavity and with its legs vulcanized upon a base comprising completely separated portions corresponding to the portions 11$^a$, 11$^b$, Fig. 4, the bridges 11$^c$ being omitted. In this form the core members, $a$, $b$, $c$ and $d$, may be relatively few in number, and are so formed as to constitute, when assembled, a complete annulus of uniform cross section, the sections thereof abutting on planes such that one of them, constituting a key section, $a$, may be withdrawn radially inward from the tire body without crowding adjacent sections, and the other sections thereafter may readily be withdrawn. Each core section in this modification comprises a molding portion 14$^{aa}$ and a relatively wide base portion 14$^{bb}$, corresponding in function to the similar parts 14$^a$, 14$^b$ in the principal embodiment of my invention above described, and the split ring 16 may be used therewith in the same manner.

Further modifications may be resorted to without departing from the scope of my invention, and I do not limit my claims wholly to the specific construction shown.

I claim:

1. Apparatus for making a cushion tire-body comprising an annular metal base adapted to support said tire-body, a set of core members formed with molding portions adapted to extend beyond said base into the tire-body and with portions adapted to underlie and abut said base, and means for urging said core members outward against said base.

2. Apparatus for making a cushion tire-body comprising an annular metal base adapted to support said tire-body, a set of core members formed with molding portions adapted to extend beyond said base into the tire-body and with portions adapted to underlie and abut said base, and a transversely split ring for holding said core members outward against said base.

3. Apparatus for making a cushion tire-body comprising an annular metal base adapted to support said tire-body, a set of core members formed with molding portions adapted to extend beyond said base into the tire-body and with portions adapted to underlie and abut said base, and a transversely split ring for holding said core members outward against said base, said ring being formed with a groove adapted to receive the arms of a spider.

4. Apparatus for making a cushion tire-body comprising an annular metal base adapted to support said tire-body, a set of core members formed with molding portions adapted to extend beyond said base into the tire-body and with portions adapted to underlie and abut said base, each of the last said portions being formed with a beveled surface on its inner periphery, and a mold section formed with a beveled surface adapted to abut those of said core members.

5. Apparatus for making a cushion tire-body comprising a metal base adapted to support said tire-body and formed with openings therethrough from its inner to its outer periphery, and a set of core members formed with molding portions adapted to extend outward through said openings and with base portions adapted to abut the inner face of said base.

6. Apparatus for making a cushion tire-body comprising a metal base adapted to support said tire-body and formed with openings therethrough from its inner to its outer periphery, a set of core members formed with molding portions adapted to extend outward through said openings and with base portions adapted to abut the inner face of said base, said base portions being formed with beveled surfaces on their inner peripheries, and mold sections formed with beveled faces adapted to abut those of said core members.

7. Apparatus for making a cushion tire-body comprising a metal base adapted to support said tire-body and formed with openings therethrough from its inner to its outer periphery, a set of core members formed with molding portions adapted to extend outward through said openings and with base portions adapted to abut the inner face of said base, and means for urging said core members outward against said base.

8. Apparatus for making a cushion tire-body comprising a metal base adapted to support said tire-body and formed with openings therethrough from its inner to its outer periphery, a set of core members formed with molding portions adapted to extend outward through said openings and with base portions adapted to abut the inner face of said base, and a transversely split ring for holding said members outward against said base.

9. Apparatus for making a cushion tire-body comprising a metal base adapted to support said tire-body and formed with openings therethrough from its inner to its outer periphery, a set of core members formed with molding portions adapted to extend outward through said openings and with base portions adapted to abut the inner face of said base, and a transversely split ring for holding said members outward against said base, said ring being formed with a groove adapted to receive the arms of a spider.

10. Apparatus for making a cushion tire comprising a two-part mold at least one of the sections of which is formed with a molding cavity having a frusto-conical wall at its inner periphery, and a set of core members each formed with a molding portion adapted to extend through an opening in a tire base into the tire-body and with a base portion adapted to abut the inner face of the tire base, said base portion being formed with a beveled face on its inner periphery adapted to be abutted by the beveled face of the mold section.

11. Apparatus for making a cushion tire comprising a two-part mold at least one of the sections of which is formed with a molding cavity having a frusto-conical wall at its inner periphery, a set of core members each formed with a molding portion adapted to extend through an opening in a tire base into the tire-body and with a base portion adapted to abut the inner face of the tire base, said base portion being formed with a beveled face on its inner periphery adapted to be abutted by the beveled face of the mold section, and a ring adapted to hold said core members outward against said tire base.

12. Apparatus for making a cushion tire-body comprising an annular metal tire base adapted to support said tire-body and formed with circumferentially aligned slots therethrough from its inner to its outer periphery and with bridges separating said slots, and a set of core members each formed with a molding portion adapted to extend through one of said slots into the body of the tire and with a base portion adapted to abut the inner face of said tire base to limit the outward movement of said core member, said molding portion extending beyond the base portion at one end and cut away to accommodate one of said bridges.

13. Apparatus for making a cushion tire-body comprising an annular metal tire base adapted to support said tire-body and formed with circumferentially aligned slots therethrough from its inner to its outer periphery and with bridges separating said slots, and a set of core members each formed with a molding portion adapted to extend through one of said slots into the body of the tire and with a base portion adapted to abut the inner face of said tire base to limit the outward movement of said core member, said molding portions and base portions having oblique faces at their ends and so formed as to constitute complete annular structures when assembled in said tire base.

In witness whereof I have hereunto set my hand this 4th day of October, 1921.

JOHN R. GAMMETER.